US008924552B2

(12) United States Patent
Hjelm

(10) Patent No.: US 8,924,552 B2
(45) Date of Patent: Dec. 30, 2014

(54) REMOTE AND LOCAL COMPOUND DEVICE CAPABILITIES SYNCHRONIZATION METHOD AND SYSTEM

(75) Inventor: Johan Hjelm, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1748 days.

(21) Appl. No.: 12/118,849

(22) Filed: May 12, 2008

(65) Prior Publication Data

US 2009/0282458 A1    Nov. 12, 2009

(51) Int. Cl.
 *G06F 15/173* (2006.01)
 *H04L 29/06* (2006.01)

(52) U.S. Cl.
 CPC .................................. *H04L 69/24* (2013.01)
 USPC ........................... 709/225; 709/219; 709/250

(58) Field of Classification Search
 USPC ......... 709/217, 219, 223, 225, 227, 228, 229, 709/250
 See application file for complete search history.

(56) References Cited

U.S. PATENT DOCUMENTS

| 2003/0028621 | A1* | 2/2003 | Furlong et al. ............... 709/219 |
| 2003/0041100 | A1 | 2/2003 | Nilsson et al. |
| 2003/0084300 | A1* | 5/2003 | Koike ........................... 713/182 |
| 2003/0104827 | A1* | 6/2003 | Moran et al. .................. 455/466 |
| 2008/0220759 | A1* | 9/2008 | Norrman ....................... 455/419 |
| 2009/0248620 | A1* | 10/2009 | Vermette et al. .................. 707/2 |

FOREIGN PATENT DOCUMENTS

| JP | 2003-132160 A | 5/2003 |
| JP | 2005-318057 A | 11/2005 |
| JP | 2006-526358 A | 11/2006 |
| WO | 2004075594 A1 | 9/2004 |
| WO | 2004084459 A2 | 9/2004 |

OTHER PUBLICATIONS

W3C Device Description Working Group (Closed), pp. 1-4, http://www.w3.org/2005/MWI/DDWG.
DSL Forum Technical Report TR-069, CPE WAN Management Protocol v1.1, Version: Issue 1, Amendment 2, Dec. 2007, pp. 1-138.
PCT International Search Report, mailed Jul. 17, 2009, in connection with International Application No. PCT/SE2009/050253.
PCT Written Opinion, mailed Jul. 17, 2009, in connection with International Application No. PCT/SE2009/050253.
Japanese Office Action, mailed Jul. 5, 2013, in connection with Japanese Patent Application No. 2011-509437 (see translation below), all pages.
Translation of Japanese Office Action, mailed Jul. 5, 2013, in connection with Japanese Patent Application No. 2011-509437, all pages.

* cited by examiner

*Primary Examiner* — Viet Vu
(74) *Attorney, Agent, or Firm* — Leffler Intellectual Property Law, PLLC

(57) ABSTRACT

A method and system allow applying policies to service requests for information or a session, which are created by communications devices and are intended to be sent to service providers over a network. The policies govern the extent to which details about the communications devices sending the requests are released or revealed to that service provider. After amount of capabilities corresponding to the extent allowed by the polity is determined and provided in the service request, the service request is sent over the network to the service provider. Policy based disclosure of communications device capabilities information may be applied in local network embodiments, such as a home or small office network including local sever and residential gateway functions.

17 Claims, 6 Drawing Sheets

REMOTE AND LOCAL COMPOUND DEVICE CAPABILITIES SYNCHRONIZATION METHOD AND SYSTEM

FIELD OF THE INVENTION

The invention relates to handling device information, and more particularly, to a method and system for accumulating and presenting device capability information.

BACKGROUND

The evolution of IP (Internet Protocol) based next-generation network (NGN) architectures, which converge numerous single-purpose fixed and mobile networks and services, has provided new services for mobile and fixed voice, data and video. At the same time, devices have been evolving to provide access to services offered on such networks. For instance, some existing devices and those being developed may be capable of receiving and processing a variety of services such as real-time-gaming applications, voice and/or video (e.g., IP telephony), video on demand (VoD), interactive and/or background file download and uploading, television (e.g., IPTV), Internet, email, short message service (SMS), and video conferencing. Consumers of these services may have a variety of devices in their homes and offices, on their persons, in their vehicles etc.

To provide adequate or optimal service provisioning, service/content providers should collect information about the devices receiving the services/content, such as end devices (e.g., legacy terminals, a SIP (Session Initiation Protocol) compatible phone, soft-phone, set top box, multimedia terminal, a PC (Personal Computer), or other wired or wireless terminals) or gateways (e.g., residential gateways), intermediate user devices and a wide area network (e.g., an IP WAN) or an IP core network, e.g., IMS (IP Multimedia Subsystem) core network). When one or a combination of these devices communicates a service request to a service provider (e.g., for video and/or audio information to be played on the user's equipment), the service request should include information about the particular device, such as capabilities information and possibly also a user's preferences. For example, to ensure proper transcoding, the requested information may be supplied in a compatible format e.g., MPEG-4 (Moving Picture Experts Group 4) versus MPEG-2.

Device information, such as capabilities is typically contained in a protocol header. For example, a SIP SDP (Session Description Protocol) or HTTP (Hypertext Transfer Protocol) UAPROF (User Agent Profile) header may contain device information, and this information is reported to the server where it is to be used either when the information is requested or when setting up a session with the server (or an intermediary entity, such as the IMS Core network).

In existing device capabilities management systems, a limited set of capabilities can be derived from a central database. However, some capabilities can only be retrieved from the devices themselves. Additionally, the methods to derive device capabilities vary wildly. For instance, methods for obtaining capabilities information may include discovery, presentation at invitation, presentation at request etc. These methods may conflict with one another; and no two methods necessarily use the same format.

SUMMARY

Embodiments in accordance with the invention generally relate to applying policies that govern the extent to which details about the capabilities of a communications device sending a request for information or a session to a service provider are released or revealed to that service provider. It is therefore an object of the invention to provide a method and system for a communication device to release capabilities information to service provider according to semantics and/or policies.

In some aspects, a communications device sends a service request for information or a session to a service provider. The request includes identification information about the service provider. Before the request is sent over the network to the service provider, it is first examined to determine a policy to be applied to device information about the communications device based on the identification information. Based on the determined policy, an amount of the device information corresponding to an extent permitted by the policy is determined and provided in the service request. For example, a set of device capabilities information already accompanying the service request may be modified based on the determined policy, or the device capabilities may be derived from a set of capabilities for the communication device stored in local memory based on the determined policy. After the amount of capabilities is determined and provided in the service request, the service request is sent over the network to the service provider.

Other aspects involve a system for releasing device information related to a communications device to a service provider. The system includes a receiving component that receives a service request sent from a communications device to service provider, where the service request includes information identifying the service provider. For example, the receiving component may be included in a home server or a gateway. The system includes storage that stores at least one information set comprising device capabilities information associated with a communications device and at least one policy to be applied when releasing device capabilities information. The system also includes an associations data structure that stores information associating each stored policy with information identifying at least one service provider. For example, a home server and/or gateway may include memories that store data structures including device capabilities information, and associations of policies with service providers, in the form of one or more databases. A policy implementation module determines which stored policy to apply to an information set associated with the communications device that sent the request. This determination is based on information stored in the associations data structure and the received information identifying the service provider. The policy implementation module provides to the service request an amount of the device capabilities from the information set, where the amount corresponds to an extent permitted by the determined policy, and sends the service request including the determined amount of the device capabilities information to the service provider.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 4a depicts an exemplary policy management system.

FIG. 4b depicts an exemplary data structure of the policy management system of FIG. 4a.

DETAILED DESCRIPTION

Figure 1:
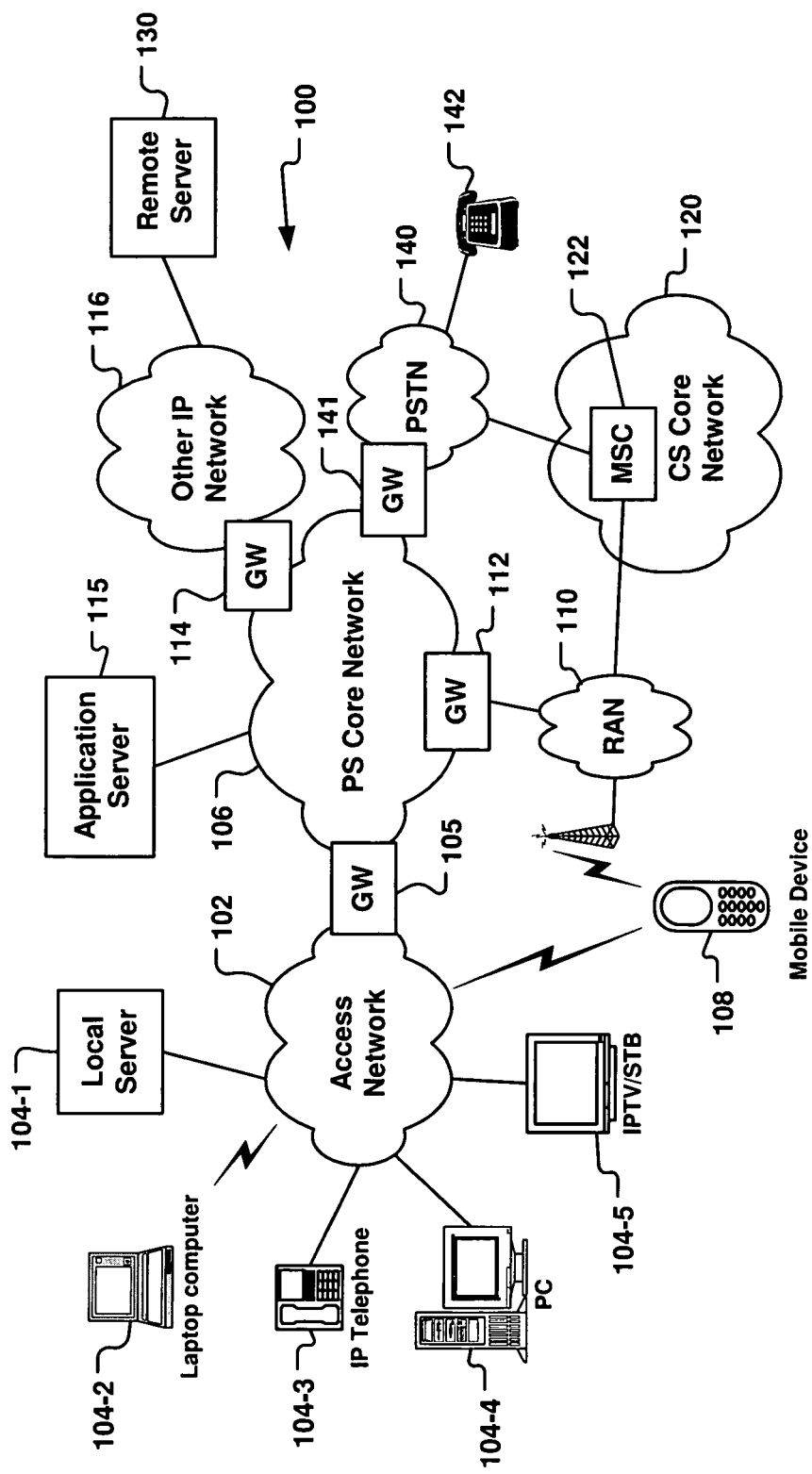
FIG. 1 shows a generalized network environment employing fixed and mobile networks according to some embodiments.

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors, or by a combination of both. Moreover, the invention can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory such as EPROM (Erasable Programmable ROM), EEPROM (Electrically Erasable Programmable ROM) or Flash memory, or any other medium capable of storing information. Thus, the various aspects of the invention may be embodied in many different forms, and all such forms are contemplated to be within the scope of the invention.

Furthermore, it should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

With the growing popularity of network devices having capabilities spreading across a broad range of media and bandwidth, a service and/or content provider (hereafter, referred to more generally as a "service provider" or "remote server") may be aware of a requesting device's capabilities to provide multimedia content commensurate with the device's ability to process the data. The invention enables a local server (e.g., a home server), which is responsible for the discovery of possible attributes that can characterize devices (i.e., device capabilities) in the local network, to also retrieve and use device capabilities stored at a remote storage location, which are retrieved through a connectivity gateway, for example, a residential gateway. In one exemplary embodiment described herein, a residential gateway may include an IP Multimedia Subsystem Gateway, for example, a Home IMS Gateway (HIGA) function, although a gateway may be more generic than a HIGA, or the HIGA function may reside elsewhere in the local (e.g., residential) network. The connectivity gateway may also represent devices the local server has discovered towards the external world.

The invention also relates to accumulation of device capability information and subsequent presentation of this information to an outside service provider when a request for service or content to is made to that service provider. The accumulation and presentation of device capabilities presents the following two issues addressed herein: (1) efficient accumulation of the information representing the various capabilities of a user's communications devices; and (2) to what extent a user wants to reveal to the outside world what he or she may consider to be personal or otherwise sensitive information about the user's communications devices (e.g., devices communicating on his or her home network and/or a mobile network).

FIG. 1 presents an overview of an exemplary network environment 100 in which the invention may be implemented. The network environment 100 includes an Access Network 102, which may include a number of access technologies available to one or more communications devices, such as a depicted Local Server 104-1, laptop computer 104-2, IP telephone 104-3, personal computer 104-4 and IPTV and/or set top box (STB) 104-5. For purposes of the present disclosure, a "communications device" may be any tethered or untethered communications device, and may include any personal computer (e.g., desktop, laptop, personal digital assistant (PDA) (e.g., palmtop), notebook, server computer, television or handheld computing device) equipped with a suitable fixed wired or wireless modem, a mobile communications device (e.g., cellular phones or data-enabled handheld devices capable of receiving and sending messages, web browsing etc.), or any enhanced communications device (e.g., PDA) or integrated information appliance capable of email, video mail, Internet access, corporate data access, messaging, calendaring and scheduling, information management, and the like through the Internet, intranets or extranets via e.g. any IEEE 802.11 standard, IEEE 802.15 standard, IEEE 802.16 standard, or Wireless Wide-Area Networks (WWANs). In some embodiments, one or more communications devices may be capable of operating in multiple modes (e.g., Dual Transfer Mode (DTM) or Multi-Radio Access Bearer (RAB) terminals) in that these devices may engage in both circuit-switched (CS) as well as packet-switched (PS) communications, and can transition from one mode of communications to another mode of communications without loss of continuity.

The Access Network 102 may include one or a plurality of nodes for providing access to a PS CN (Core Network) 106. The PS CN 106 may be, for example, a "backbone" network based on IP (i.e., an "IP BB") and may support an IMS (e.g., as an IMS CN) for providing multimedia telephony, interactive and personalized television services, and other multimedia services and/or content.

The Access Network 102 may include both CS and PS networks, and may involve wireless technologies, wireline technologies, broadband access technologies, e.g., any type of DSL (Digital Subscriber Line), cable, fiber, fixed wireless etc. For example, the laptop computer 104-2 is depicted as connecting to Access Network 102 using a wireless node (e.g., a wireless local area network (WLAN), Worldwide Interoperability for Microwave Access (WiMAX) technology, Wi-Fi or another radio access technology selected from IEEE 802.11 technology) to connect to the Access Network 102, which may allow the laptop to communicate with other local devices through a local network and with remotely located devices through the PS CN 106. The Local Server 104-1, IP telephone 104-3, PC 104-3 and IPTV/STB 104-5 may be connected individually to the Access Network 102 or as a subnet such as wired Ethernet LAN and in combination with one or more wireless nodes. The depicted Access Network 102 may use any of a number of possible configurations to connect each of the communications devices 104-1 to 104-5 to the PS CN 106 via a gateway (GW) 105, such as xDSL access through Ethernet routes (e.g., metro Ethernet) connecting CE to a Broadband Access Server (BRAS) (e.g., through a Digital Subscriber Line Access Multiplexer (DSLAM)), although any of these devices may connect wirelessly via a WLAN, WiMAX, Wi-Fi, IEEE 802.11, Bluetooth technology or another wireless or wired access technology.

The GW 105 provides an interface between the Access Network 102 and PS CN 106, and may convert protocols among these networks. Through the GW 105, one or more of the communications devices 104-1 to 104-5 may connect to the PS CN 106 and thereafter to other devices and networks. For example, a communications device may communicate with Remote Server 130 through the PS CN 106, GW 114 and another IP Network 116 (e.g., the Internet), to an Application Server (AS) 115 that provides services and/or media content through an IMS embodiment of the PS CN 106, to a Public Switched Telecommunications Network (PSTN) 140 through the PS CN 106 and GW 141, and to mobile networks connecting via a radio access network (RAN) 110 through the PS CN 106 and GW 112.

A communications device 108 depicted in FIG. 1 is a mobile terminal, such as a mobile phone, PDA etc., which communicates with the IP Core Network 106 via the RAN 110 and/or the Access Network 102 (e.g., a WLAN node). The communications device 108 accessing the RAN 110 may connect to the IP CN 106 and its entities through GW 112, and thereafter to other entities, such as Remote Server 130 through GW 114, and the IP Network 116 (e.g., the Internet).

The GW 114 may be implemented as an edge router, such as a border gateway function (BGF). A border gateway function provides interface between two IP (Internet protocol) transport domains. It can be at a boundary between an access network and the customer premises equipment, between an access network and a core network or between two core networks. Through various GWs, such as GW 112, GW 114 and GW 141, the IP CN 106 may provide access to other networks, such as another IP Network 116, (e.g., Intranet, Internet), and other PS and CS networks. The communications devices 104-1 to 104-5 may have connectivity to one GW node for accessing a single Packet Data Network (PDN), or simultaneous connectivity with more than one GW node for accessing multiple PDNs.

The RAN 110 also may connect to a CS CN 120 and its entities, such as a Mobile Switching Center (MSC) 122 and other SC entities (e.g., a Home Location Register (HLR), Visitor Location Register (VLR) connected via a signaling network such as a Signaling System No. 7 (SS7), although the HLR may be replaced with a more centralized server, such as a Home Subscriber Server (HSS) that stores subscriber-related data and is shared between an IP CN and CS CN). The MSC 122 is used for connecting phone calls to the PSTN 140. The PSTN 140 may communicate with the PS CN 106 through the GW 141, which translates among the protocols used in the PS CN 106 and PSTN 130, and provides access for legacy telephone and dial up services 142.

In some embodiments, the local server 104-1 and the GW 105 may respectively comprise a home server and a residential gateway (RGW). Additionally, the RGW also may include a home interactive gateway such as a HIGA to support interoperability between IMS services and non-IMS capable consumer electronics devices. It will be understood that that a HIGA is more generally a function, and thus not necessarily implemented as a separate device or in an RGW (e.g., the HIGA function may be provided in a home server or other computing device on the network). In other embodiments, an RGW also may reside within a subnet LAN and/or WLAN comprising the devices 104-1 to 104-5 and provide an access node to an Access Network (e.g., DSL, cable, fiber, fixed wireless etc.) that includes at least one GW (e.g., an edge node, multi-access edge etc.) that provides access to an IP network (e.g., to the PS Core Network 106).

Creation of Compound Synchronized Device Information

Figure 2:
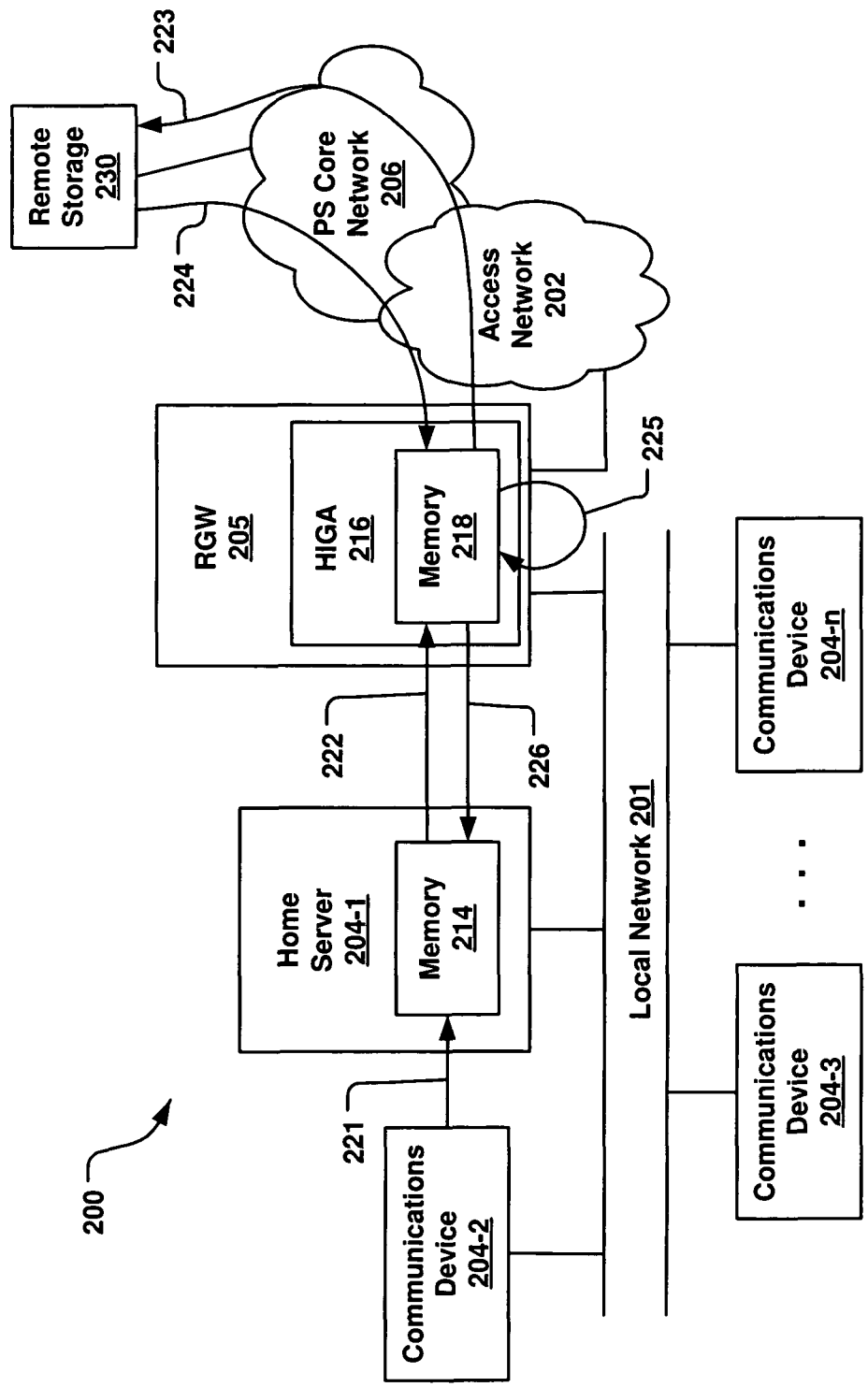
FIG. 2 shows network environment including a local network and process flow that accumulates and synchronizes capabilities information in accordance with exemplary embodiments.

In some embodiments, the Access Network 102 may comprise a small office/home office (SOHO) or residential network, which may be implemented as a local area network (LAN) and/or WLAN. FIG. 2 is a high level diagram of an exemplary network environment 200 including such a Local Network 201 (e.g., a "home" network). The Local Network 201 includes a Home Server 204-1 and an RGW including a HIGA 216. These entities work together within the network environment 200 to discover and synchronize device information related to the communications devices 204-1 to 204-n connected to the Local Network 201, where values for n may be as practically large as the Local Network 201 will support and be subject to dynamic change, although a less amount of devices may attach to, and/or communicate using the Local Network 201.

It will be appreciated that device information to be discovered and synchronized may comprise one or several information types. For instance, the device information may include device capabilities information, which is static information of a single device. This static information about the device may include information indicating its identity, type, manufacture, friendly name, services offered by the device, properties, URI to control it, and so on. While concepts of the invention described herein in connection with some embodiments involve network elements exchanging messages including primarily device capabilities information, these concepts also may be used to discover and synchronize other types of information, which may or may not be combined with one another in any relative amount. For example, device information may include dynamic information representing status information of a single device. Device information may include status information about the device, for example, a current volume setting of a media renderer such as a TV. Other device information types include a device log including a sequence of all status changes of a single device for a certain period, device statistics based on, for example, statistic information extracted from multiple device logs, and/or other information. Returning to the exemplary embodiment of FIG. 2, it will be understood that the Home Server 204-1 and the HIGA 216 are functional modules, and as such, they may be co-deployed or implemented separate from one another. Additionally, while the HIGA 216 is included with the RGW 205, it may be implemented as a device or with another device connected to the Local Network 201.

The network environment 200 efficiently accumulates information about a user's communications devices connected to the Local Network 201. As pointed out above, this information may represent capabilities of the devices, although the information may comprise one or more other information types or combinations thereof. In one phase of operation according to some embodiments, the Home Server 204-1 collects capabilities information from each of the communications devices 204-1 to 204-n connected to the Local Network 201 (e.g., in the user's premises) and communicates this information to the HIGA 216. The HIGA 216, in turn, examines the collected information, and determines whether more details about the device capabilities can be retrieved from another source, such as storage on a remote server. For example, Remote Storage 230 represents a central device capabilities database connected to the RGW 205 through the PS CN 103. If the HIGA 216 determines additional details about a communications device are available, it performs a retrieval operation. Thereafter, the Home Server 204-1 and HIGA 216 synchronize their respective memories 214 and 218 so that each has a complete set of device capabilities related information.

The creation of compound synchronized device capabilities may initially include discovering a device and registering its locally known capabilities in data structures stored in memory 214 (e.g., a local device capabilities database). This process, which is represented by the arrow 221 in FIG. 2, can be accomplished, for example, using Universal Plug and Play (UPnP™) Discovery, Bluetooth or ZeroConfiguration or similar protocols that advertise capabilities of a device and/or services it has available. Alternatively, the Home Server 204 may retrieve the information about a connected device using another protocol, such as SIP SDP carried by SIP signaling (e.g., attribute-value pairs about device capabilities such as device's screen resolution, device's memory, processing speed, etc.), HTTP UAPROF for wireless devices, and Composite Capabilities/Preferences Profiles (CC/PP).

Next, arrow 222 in FIG. 2 represents a process that involves synchronizing device capabilities between the memory 214 of the Home Server 204 and the memory 218 associated with the HIGA 216. This includes a notion of the identity of the device, for example, the maker name and model number, which can be used to retrieve capabilities information from another source. For example, the HIGA 216 may communicate, via the Access Network 202 (e.g., DSL, cable, fiber, fixed wireless etc.) and the PS CN 206 (e.g., an IMS Core Network or another packet switched network), with the Remote Storage 230, which may include a device capabilities database from which the HIGA 216 may retrieve device capabilities information. While not shown in FIG. 2, mobile devices may communicate with the PS CN 206 using another access network, such as a WiMAX and Wi-Fi access points (e.g., base stations, connected to the Local Network 201, hot spots), cellular, a combination of cellular and WiMAX or Wi-Fi (e.g., dual mode), femtocells etc.

A binding also may be made between the device capabilities data and an IP address or other similar local identifier. For example, after the device 204-2 is discovered by either the Home Server 204-1 or the HIGA 216, these devices may retrieve more device capabilities description using an URL provided by the communications device 204-2 in its advertised discovery message.

A local device capabilities data structure (e.g., database) stored in the memory 218 instance in the HIGA 216 also may check whether the data, which can be retrieved from a remote location (e.g., the Remote Storage 230), are present (e.g., filled in an associated field). For example, if the HIGA 216 determines data are missing, a request may be sent from the HIGA 216 to the Remote Storage 230 or other database or data storage resource to retrieve any of these missing data, as represented by arrow 223 in FIG. 2. One practical way to achieve this would be to synchronize the fields which contain description information between the local memory 218 and Remote Storage 230. For example, the device identity can be used as key, and synchronization of the fields can be done, for example, using SIP SUBSCRIBE/NOTIFY or some other message that allows for synchronization. Presence also may be used to synchronize the fields (i.e. when an update is done in the remote storage, for instance by a home server publishing device capabilities using SIP PUBLISH, there is a SUBSCRIBE which the HIGA has set to trigger a NOTIFY). There is a special mechanism for this which is standardized in the Open Mobile Alliance (OMA).

In response to a request for missing capabilities data sent from the HIGA 216, the Remote Storage 230 sends the requested data to the memory 218, as depicted in FIG. 2 by arrow 224.

The received data may be stored in the memory 218 in its native format, or it can be translated to another format, such as a generic format. This transformation, which is represented by arrow 225 in FIG. 2, can be used for the creation of compound device descriptions, as will be described later in detail.

The arrow numbered 226 in FIG. 2 represents a procedure in which the memory 214 synchronizes capabilities data with the memory 218. This synchronization updates the memory 214 and can be performed in several ways. For example, the data may be exchanged between the memories 214 and 218 using HTTP, and the data items are marked up with SynchML when they are to be exchanged. An agent in the memory 218, for example, an agent in a database server, handles the synchronization.

The synchronization using HTTP may be achieved as follows: an update is performed to the memory 218, which triggers a HTTP POST (or if a format which requires it is used, a HEAD) operation. The HTTP POST operation sends a POST message containing the update to the memory 214, which includes the updated information in the existing database (overwriting or amending the existing information as required). This assumes there is a HTTP user agent capable of receiving POST messages in the memory 214, and that the server supporting the memory 218 has some logic which enables it to perform the POST operation. As an alternative, which may be used if the conditions mentioned are not true, the memory 214 may poll the memory 218 at regular intervals. This implies sending a HTTP GET or HEAD request to the URI of the device information (it is well known in the art how to create and publish such URI:s, for instance using entity tags as described in section 3.11 and 13.3.2 of RFC 2616 together with for instance the "if-match" header as described in section 14.24 in the same document; the match would be against the existing device capabilities, and an empty header returned if the match was true, but the modified device capabilities returned if it was not true, i.e. the capabilities had been changed).

Another exemplary way in which the memories 214 and 218 are synchronized involves the Home Server 204-1 and the HIGA 216 performing SIP SUBSCRIBE/NOTIFY requests (methods) to each other's memories. This would imply that when one memory changes, the other will get a notification of the change, and thus be able to update its data. To prevent an endless loop (e.g., the home server gets an update, sends a NOTIFY to the HIGA, which updates its database; this generates a NOTIFY to the home server, which updates its database; this sends a NOTIFY to the HIGA and so on), filter criteria may be set. In addition, the same method can be used by an external server to receive updates of the device capabilities, i.e. subscribe to the memory 218 of the HIGA.

It also will be appreciated that although sequential numbered arrows have been used to represent procedures carried out for registering and updating capabilities information, the described steps need not be performed in the presented order. For example, procedures corresponding to arrows 221 and 223 may happen in reverse order, and the procedure corresponding to arrow 225 may be applied before the procedures corresponding to arrow numbers 222 and 224.

Additionally, although synchronization as described above is initiated from the HIGA 216, there is no preference as to whether synchronization is started from the memory 214 in the Home Server 214 or the memory 218 associated with the HIGA 216.

Release of Compound Synchronized Device Information

It may not be necessary to release the same device information to all service providers. For instance, a home or SOHO network environment may include, for example, an IP television device for receiving streaming video data. From the perspective of a service providing data, several devices connected to such a local network may be seen as a single entity. For example, from the point of view of a service provider, an IPTV connected to the local network may be capable of receiving MPEG-4 signals. However, because the TV actually can only receive and process MPEG-2 signals, the received MPEG-4 coded signal must be transcoded into a MPEG-2 coded signal before processing and display. This concept extends equally well to other types of communications devices, networks and information formats, such as static information (e.g., web pages or images), streamed information, or any other information delivery.

Also, a user may find it undesirable to provide certain types of device information, such as all device capabilities, to all potential service providers. Rather, a user may prefer to only allow "trusted" service providers with whom the user has a subscription to receive the precise configuration of the user's device(s) (e.g., home devices), and allow random "untrusted" web sites that the user visits access to only a limited amount of data, such as only the model number or some other identification information about the user's device(s).

Another issue addressed herein is management of dynamic information, such as capabilities information that may change during the course of usage and/or time. This may be an issue in environments which are not static, such as an ad-hoc network or when features of a communications device are changed or updated. In such cases, update messages may be used to provide current information. For example, if the protocol used is SIP, the device description in SDP may be updated using SIP UPDATE.

Figure 3:
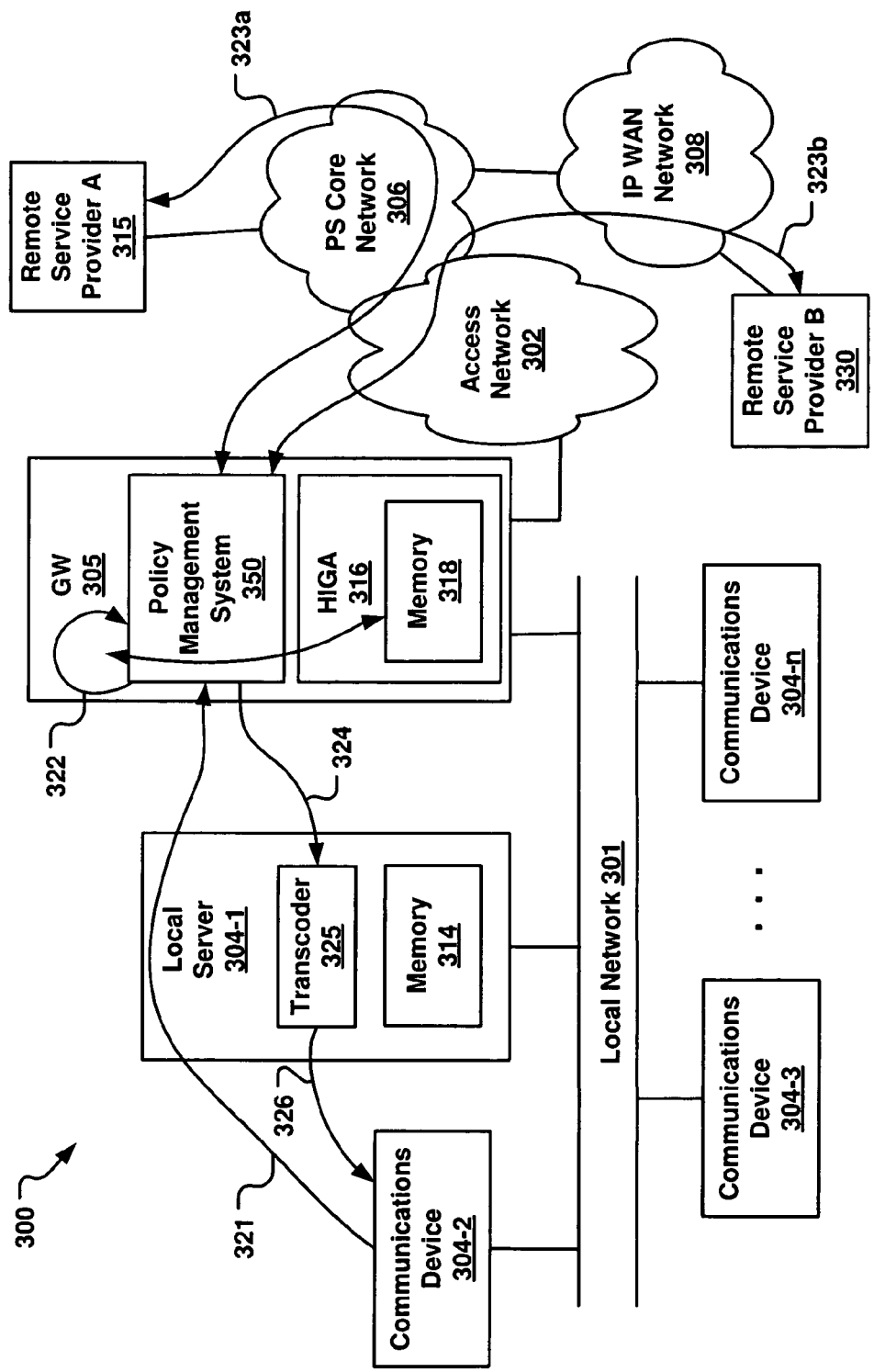
FIG. 3 shows network environment including a policy manager in a local network and process flow related to policy application when releasing capabilities information in accordance with exemplary embodiments.

FIG. 3 presents an overview of an exemplary network environment 300 illustrating aspects related to controlling an extent to which device capabilities details are provided by a user's communication device while or after making a service request, although the concepts described with respect to the FIG. 3 embodiment may extend to other types and combinations of device information. The degree of detail of capabilities information released is controlled by a set of policies associated with the communication device.

As shown in FIG. 3, the network elements of interest are a Local Network 301, which may be a LAN, WLAN or PAN (Personal Area Network) in, e.g., a residence, office or vehicle and may be incorporated into an access network or connected as a node or subnet of an access network, such as the Access Network 102 of the network environment 100 shown in FIG. 1. The Local Network 301 is connected to a PS CN 306 via the Access Network 302 (e.g., DSL, cable, fiber, fixed wireless, circuit switched telephony etc.) and the GW 305. The PS CN 306 may connect to a number of service providers, such as Remote Service Provider A 315. The PS CN 306 also may connect to other IP networks, such as IP WAN Network 308. The other IP networks may be IPv4 or IPv6 Internet to which other servers are coupled, such as Remote Service Provider B 330.

The Local Network 301 includes a Local Server 304-1 (e.g., a home server), the GW 305 and communications devices 304-2 to 304-*n*, where values for n may be as practically large as the local network 301 will support, although a less amount of devices may attach to, and/or communicate using the Local Network 301. The GW 305 includes a Policy Management System (PMS) 350, a HIGA 316, and a memory 318 for storing device capabilities information.

A policy enforcement phase of operation begins when the user initiates a service request. With reference to FIG. 3, this request is represented by arrow 321 from communications device 304-2 to the PMS 350 of the GW 305. For example, the user may request information (e.g. doing an HTTP GET request), or set up a session (e.g. sending a SIP INVITE). The PMS 350 stores a set of policies that govern to what extent that the details about the user's devices will be revealed to the outside world. For example, if the server to which the service request is directed is considered "trusted" (e.g., if the service provider is part of the IMS system), then most, if not all of the details about the device capabilities may be included with the service request. Otherwise, the service provider may be given a reduced set of information about the requesting device(s), e.g., only the model number and user agent identification of the device, along with the service request.

As represented by arrow 322, policies stored with or accessible by the PMS 350 are applied to a request for information. The policies may be provisioned by an operator, or created by the user, or occur by some other means. The function of the PMS 350 is to check the address or other identifying data of the receiver of the request or session, and verify whether it is trusted or has some restriction associated with the release of the requesting device's device information, and so create or modify the device information accompanying the request or session accordingly.

Figure 4:
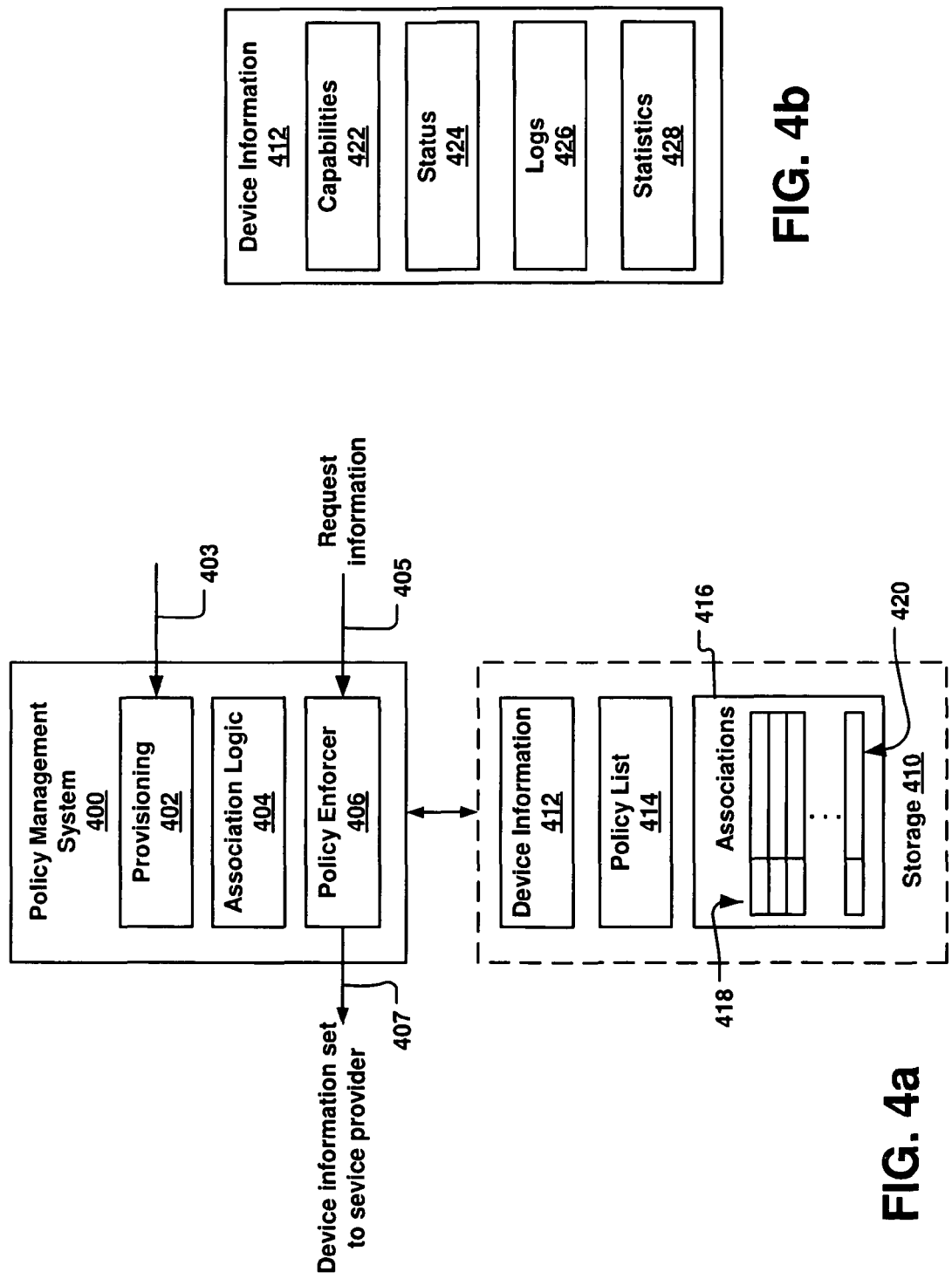

FIG. 4*a* shows an exemplary PMS 400 in more detail. The items of interest include a Provisioning module 402, Association Logic module 404, and a Policy Enforcer module 406.

The PMS 400 maintains and utilizes a plurality of data structures in Storage 410, which represents memory that may be co-located or distributed over any number of locations accessible to modules of the PMS 400. The data structures stored in Storage 410 include Device Information 412, Policy List 414 and Associations 416.

While it is envisioned that a policy management system would primarily enforce policies with respect to how device capabilities are released, the invention is not limited only to one device information type. For example, The PMS 400 may handle other types of device information individually or in any combination with capabilities information. FIG. 4*b* shows an exemplary Device Information 412 data structure that may include a plurality of data types including device capabilities 412, device status 424, device logs 426 and/or device statistics 428.

The data structure Policy List 414 lists policies that may represent an amount of detail from simple binary states (e.g., trusted/untrusted) to highly customized levels of definition. The Policy List 414 may be provisioned through the interface 403 to allow for updating, editing and managing of the various policies by any authorized party (e.g., an external agent or other party, an administrator or user).

The Associations 416 is a data structure in the Storage 410 that includes a list of associations of service provider addresses (IP addresses) or other service provider IDs 418 and policy definitions 420. The policy definitions may restrict information to be released, for example, a policy may restrict device information released to a subset of a device's information stored in the Device Information 412, according to one or more policy definitions 420 associated in a one-to-one, many-to-one, or one-to-many basis with service provider IDs 418.

The Provisioning module 402 allows for updating, editing and managing of the various policies by any authorized party (e.g., an external agent or other party, an administrator or user) through an interface 403. For example, the Provisioning module 402 may be used to create and/or manage policies listed in the Policy List 414.

The Association Logic 404 defines associations of policies listed in the Policy List 414 and an address, e.g. an IP address, or other data identifying a service provider. The Association Logic 404 also may include an interface (not shown) for provisioning the logic by a third party or the user or be accessible through another interface such as interface 403 of the Provisioning module 402.

The Policy Enforcer 406 is configured to receive a request at 405, which may include data identifying a service provider device. The request may originate from an action performed on the user's communication device and include an information set, for example, a set of device capabilities that may be modified by the Policy Enforcer 412 according to policies associated with the receiving device. A request handled by the Policy Enforcer 406 also may originate from a service provider in response to an initial request sent to that provider from a user's communication device. In any case, the Policy Enforcer 406 outputs a device capabilities subset, at 407, based on either a set of the device capabilities data of the user's communications device stored in Storage 410 (e.g., a device capabilities database stored with a local server or with a GW or devices and/or capabilities stored in a distributed fashion across several memories) or a capabilities set related to the user's communications device that may accompany the request, and a modification of the set according to an associated policy defined for the receiving provider device stored in the data structure of the Associations 416.

Returning to FIG. 3, device information, such as capabilities information in this embodiment may be derived from storage, such as the memory 318 of the HIGA 316 that locally stores the device capabilities (e.g., a local device capabilities database), although any storage location accessible to the PMS 350 may be used, such as memory associated with any of the communications devices 301-1 to 304-n, a separate database (e.g., Network Attached Storage (NAS)) etc.

In some embodiments, the device's current configuration may be identified using the device identity and/or its IP address. If the configuration is stored in a generic format, the generic format may be used. If the configurations are stored in their original (native) formats, the original formats may be translated to a generic format, and the capabilities information is derived from the translated data. For example, a service that requires configuration information may be capable of using information encoded in the SDP format. However, the device properties information stored in memory (e.g., memory 214 or 314) may be stored in the UPnP format. To make this information usable, a policy may be defined and applied to enable the synchronization as well as the translation into a format that permits assertions, and contains rules for whom this information should be made available. This would involve retrieving the information from the respective sources, translating the information into a format which enables assertions to be derived, such as OWL, the Web Ontology Language, specified by the W3C. Having done this, the retrieved statements in the ontology language may be used to derive a set of assertions about the device using formal logic according to well-known methods. When this is done, these derived assertions may be subjected to a set of rules, which may be expressed in the same format (note that this is not possible in OWL, although it is possible in other similar languages). These rules can, for instance, determine how often a synchronization operation should be performed with certain parties, and what information is desirable to release to certain parties, e.g. Service provider A gets only capability information related to codecs once every 30 minutes, whereas service provider B gets information about memory, processor, and installed codecs every 15 minutes. Alternatively, the capabilities information may be stored and utilized in its native format. Device capabilities also may be capabilities data that accompany a request, which may be thereafter modified according to the policies stored in memory (e.g., memory 318) associated with the receiving service provider.

The device capability information which is presented to the service providers may depend on the trustworthiness of the service provider. For example, it may be a defined policy that any service provider in the IMS system is assumed trustworthy, and any other service provider is not. If a request were made by a communications device to a service provider located in an IMS Core Network, the remote service provider would be assumed trustworthy and provided the complete set of device capabilities. More sophisticated algorithms may be applied, and these can be expressed as policies and executed in a policy management system. For example, a selection of a particular policy may be based on whether the service provider, the user, or a third party is paying for the information requested.

In some embodiments, the PS CN 306 may be an IMS CN that is assumed to be trusted, and thus the Service Provider A 315 connected to the IMS system also is assumed to be trusted. As such, the Service Provider A 315 receives complete information about the device capabilities, as shown by arrow 323a in FIG. 3. After receiving the information, the Service Provider A 315 returns a nicely formatted information set, which generally makes the user happy or otherwise complacent to utilize. Conversely, as illustrated by arrow 323b, if the Service Provider B located outside the trusted system (e.g., outside an IMS system) is assumed not to be trusted, and a request is made for information from that untrusted server, Service provider B would receive a truncated version of the device capabilities (e.g., only the model number and user agent identification of the requesting communication device). After receiving the truncated capabilities information, service provider B may returns web pages of undesirable or outdated quality, which the user may find unacceptable and immediately discard.

The path of arrows 324 and 326 represents the requested information being returned to the user's communication device 304-2. In this process, the information may be transcoded by the Transcoder 325, although the data transmitted via the PMS 350 may be transmitted to the communications device without being transcoded. The transcoding by the Transcoder 325 may take the form of streaming transcoding or static transcoding of text or images. The Transcoder 325 may use the device description to determine how the data should be transcoded (e.g., the communication device receiving the information may be a television whose description indicated a particular data format is required), but it also may use a set of transcoding rules that control how the transcoding should be applied. These transcoding rules may follow the same principles as policies. After transcoding the received information, the information is delivered to the user, as represented in FIG. 3 by arrow 326 from the Transcoder 325 to the communications device 304-2.

Figure 5:
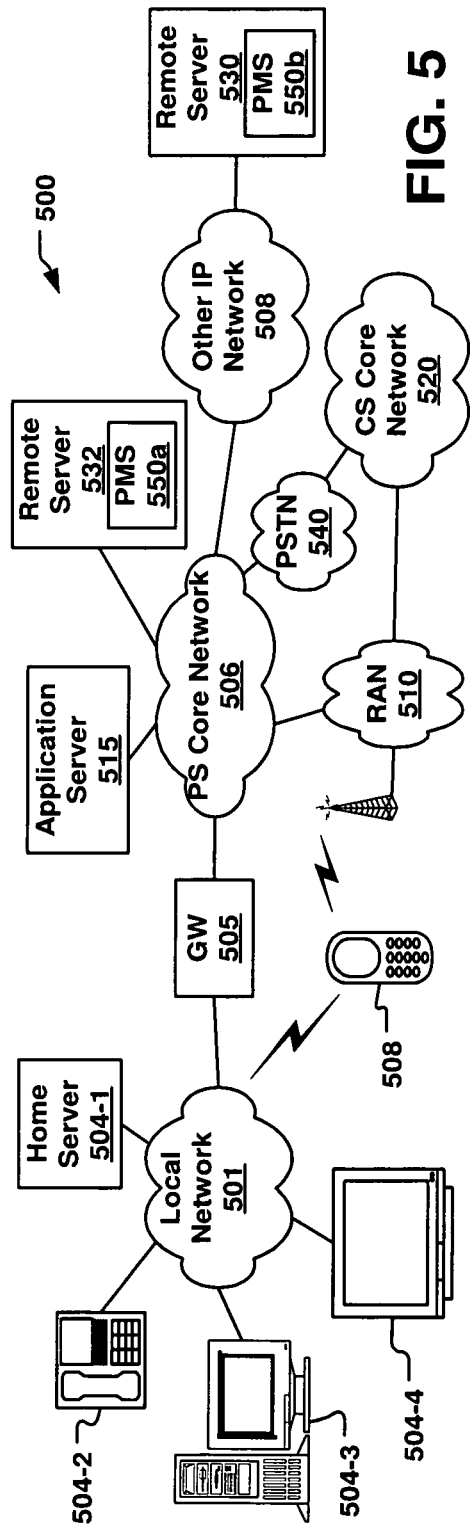
FIG. 5 shows a generalized network environment in which a policy management system is included with remote servers connected to different IP networks.
Figure 6:
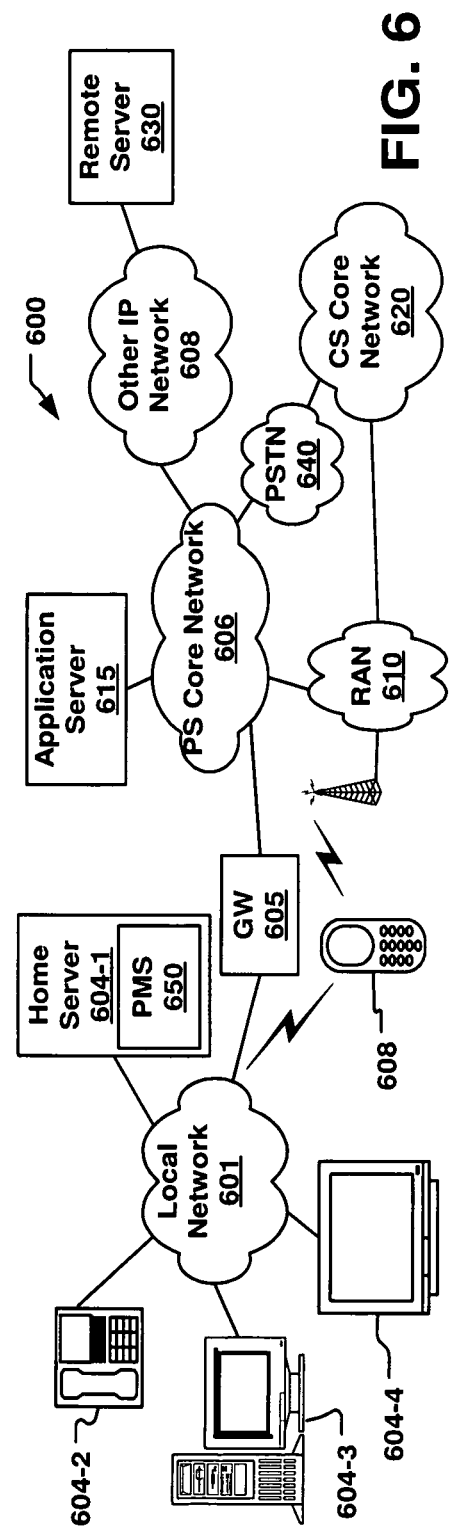
FIG. 6 illustrates a generalized network environment in which a policy management system is included with a home server connected to a local network.

It will be appreciated that the embodiments described herein are exemplary rather than in a restrictive sense, and that the concepts of the invention may be implemented in a number of ways not explicitly shown herein without departing from the broader spirit and scope of the invention as set forth in the claims. For example, the transcoding processes may take place in any of a number of devices communicating with the Local Network 301, or not occur at all. Also, although the PMS is shown along with a HIGA in a gateway, the PMS may be implemented in a HIGA, in the Local Server, in some other device or its functions distributed among a plurality of devices. For example, the PMS can equally well reside in the Home Server, which can also fulfill the same role as the HIGA. As shown in FIGS. 5 and 6, in which like reference numbers are used to depict items similar to those shown in FIGS. 1 and 3, the PMS function may be included elsewhere in the network, such as within one or more remote servers, for example, Remote Server 550a and/or Remote Server 550b (e.g., an IMS Application Server or Internet server), and/or at some other location such as a Local Server (e.g., a home server), for example, Home Server 604-1.

Also, while FIG. 3 does not illustrate mobile devices, such devices may communicate with the PS CN 306 through other access networks, such as a WiMAX and Wi-Fi access points (e.g., through base stations either separate from or connected to the Local Network 301, hot spots etc.), cellular, a combination of cellular and WiMAX or Wi-Fi (e.g., dual mode handsets), femtocells etc.

Further, in case SIP SUBSCRIBE/NOTIFY is used to exchange the updated data, the policies can be expressed as filter criteria, for example, as defined in IETF (Internet Engineering Task Force) RFC 4660 and 4661.

Figure 7:
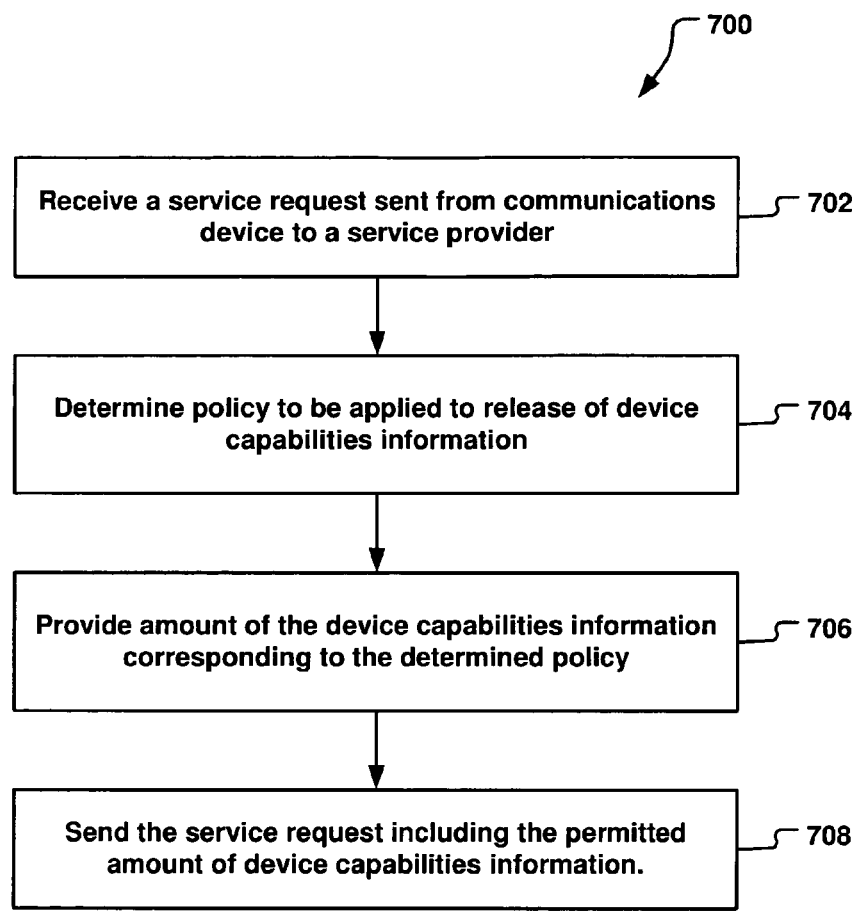
FIG. 7 depicts a simplified flowchart of a method for applying policies to service requests in accordance with some exemplary embodiments.

FIG. 7 depicts a simplified flowchart 700 of a method of applying policies to service requests in accordance with some exemplary embodiments. In the method, a service request sent from communications device to a service provider and including identification information about the service provider is received at 702. The receipt can be by a home server (e.g., a dedicated server or general purpose PC configured as a server) or gateway device (e.g., residential gateway or HIGA). The receiving device includes storage that stores at least one device capabilities set corresponding to the communications device sending the request. At 704, the policy to be applied to device capabilities information about the communications device is determined based on the identification information that was included in the service request. An amount of the device capabilities information corresponding to an extent permitted by the determined policy is provided to the service request at 706. For example, a set of capabilities already accompanying the service request may be modified based on the determined policy, or the device capabilities may be derived from a set of capabilities for the communication device stored in local memory based on the determined policy. The policy governing the allowable amount may be set in almost any desired way, such as based on whether the server is on a trustworthy system (e.g., all capabilities are disclosed to trusted servers), based on a selection by the service provider, the user, a third party, a party paying for the information, or some other basis. The service request including the permitted amount of device capabilities information is sent over the network to the service provider at 708.

The invention allows for use of device capabilities information from multiple sources, including both local devices and central databases. It allows for combining device capabilities from a central database and local sources, which may be dynamic (i.e. vary during a session) into one comprehensive format, as well as re-translation into different formats if required. Synchronization of databases in home server and connectivity gateway enables the combination of different parts of data, and use of policies allows conditional release of data.

It will be apparent to those skilled in the art that various changes and modifications can be made in the method and system for accumulating and presenting device capability information of the present invention without departing from the spirit and scope thereof. Thus, it is intended that the invention cover the modifications of this invention provided they come within the scope of the appended claims and their equivalents.

What is claimed is:

1. A method of releasing device information related to a communications device over a network to a service provider, comprising:
   receiving a service request sent from the communications device to the service provider, said request including identification information about the service provider;
   determining a policy to be applied to device capabilities information about the communications device based on the identification information;
   providing an amount of the device capabilities information to the service request, said amount corresponding to an extent permitted by said policy; and
   sending the service request including the amount of the device capabilities information over the network to the service provider.

2. The method according to claim 1, wherein determining a policy to be applied involves determining whether a policy associated with the service provider indicates that the service provider should receive all of the capabilities information available for the communications device, and if so, sending all the available device capabilities information to the service provider.

3. The method according to claim 1, wherein the policy is selected from a plurality of policies stored in a data structure, each said policy associated with identification information of at least one service provider.

4. The method according to claim 3, wherein the data structure is stored in a gateway connected to a local network along with the communications device.

5. The method according to claim 4, wherein the gateway is comprised in the local network and comprises an IP Multimedia Subsystem Gateway, and the steps of receiving, determining and sending are performed by the IP Multimedia Subsystem Gateway.

6. The method according to claim 3, wherein the data structure is stored in a local server connected to a local network along with the communications device.

7. The method according to claim 3, wherein the data structure is stored in a service provider located remote from a local network along with the communications device.

8. The method according to claim 1, wherein the communications device is connected to a local network along with a home server, and the steps of receiving, determining and sending are performed by the home server.

9. The method according to claim 1, further comprising:
receiving information from the remote server in response to sending the service request; and
transcoding the received information; and
sending the transcoded information to the communications device.

10. The method according to claim 9, wherein said transcoding is performed according to at least one rule stored in an information set associated with the communications device.

11. A system for releasing device information related to a communications device to a service provider, comprising:
a receiving component that receives a service request sent from the communications device to the service provider, said service request including information identifying the service provider;
storage that stores at least one information set comprising device capabilities information associated with a communications device and at least one policy to be applied when releasing device capabilities information;
an associations data structure that stores information associating each stored policy with information identifying at least one service provider; and
a policy implementation module that determines which stored policy to apply to a stored information set associated with the communications device that sent the request, said determination based on information stored in the associations data structure and the received information identifying the service provider, provides to the service request an amount of the device capabilities from the information set, said amount corresponding to an extent permitted by the determined policy, and sends the service request including the amount of the device capabilities information to the service provider.

12. The system according to claim 11, wherein the policy implementation module is provided in a gateway for connecting to a local network along with the communications device.

13. The system according to claim 12, wherein the gateway is adapted to be comprised in the local network and comprises an IP Multimedia Subsystem Gateway.

14. The system according to claim 11, wherein the policy implementation module is provided in a local server connected to a local network along with the communications device.

15. The system according to claim 11, wherein the policy implementation module is provided in a service provider located remote from a local network including the communications device.

16. The system according to claim 11, wherein the communications device is connected to a local network along with a home server, and the policy implementation module is provided in the home server.

17. The system according to claim 11, further comprising a transcoder that receives information from a service provider in response to the service request sent from the policy implementation module, transcodes the received information, and sends the transcoded information to the communications device.

* * * * *